United States Patent [19]
Olsson

[11] Patent Number: 5,791,565
[45] Date of Patent: Aug. 11, 1998

[54] HYDROSTATIC BEARING FOR MONITORS

[75] Inventor: Ove Olsson, Kungälv, Sweden

[73] Assignee: Svenska Skum AB, Sweden

[21] Appl. No.: 663,146

[22] PCT Filed: Dec. 5, 1994

[86] PCT No.: PCT/SE94/01167

§ 371 Date: Jul. 15, 1996

§ 102(e) Date: Jul. 15, 1996

[87] PCT Pub. No.: WO95/16499

PCT Pub. Date: Jun. 22, 1995

[30] Foreign Application Priority Data

Dec. 13, 1993 [SE] Sweden .................. 9304121

[51] Int. Cl.[6] .................. B05B 15/06; B05B 15/08
[52] U.S. Cl. .................. 239/587.1; 239/273; 384/123
[58] Field of Search .................. 239/273, 280, 239/282, 587.1, 587.5; 384/121, 123; 169/24

[56] References Cited

U.S. PATENT DOCUMENTS

| | | | |
|---|---|---|---|
| 1,674,693 | 6/1928 | MacGregor | 239/280 |
| 2,086,724 | 7/1937 | McAulay | 239/273 |
| 3,119,639 | 1/1964 | Adams | 384/121 |
| 3,685,875 | 8/1972 | Dee | 384/121 |
| 3,752,542 | 8/1973 | Kraus | 384/123 |
| 4,498,626 | 2/1985 | Pitchford | 239/587.5 X |
| 4,674,686 | 6/1987 | Trapp | |
| 4,892,418 | 1/1990 | Asada et al. | 239/273 X |
| 5,249,632 | 10/1993 | Sparling et al. | 239/273 X |

FOREIGN PATENT DOCUMENTS

| | | |
|---|---|---|
| 0036287 | 9/1981 | European Pat. Off. |
| 0567436 | 10/1993 | European Pat. Off. |
| 2539825 | 3/1977 | Germany |
| 2248892 | 4/1992 | United Kingdom |

*Primary Examiner*—Andres Kashnikow
*Assistant Examiner*—Robin O. Evans
*Attorney, Agent, or Firm*—Lerner, David, Littenberg, Krumholz & Mentlik

[57] ABSTRACT

The invention relates to a monitor for ejecting jets of water, foam or mist, comprising a pipe system attached to a foot support, which is rotatable on the support. The foot support is characterized by a lower disc-shaped part (10), an upper part (13), which is rotatable with respect to the lower part (10), and a fastening ring (15) which presses a flange (14) of the upper part (13) against the lower part (10). The invention consists of arranging through-holes in the upper part (13) from the central hole to the gap between the fastening ring (15) and the flange (14). A hydrostatic bearing between the flange (14) and the fastening ring (15) has been brought about so that the flange and the upper part (13) can be easily rotated.

6 Claims, 2 Drawing Sheets

5,791,565

HYDROSTATIC BEARING FOR MONITORS

FIELD OF THE INVENTION

The present invention relates to a monitor for ejecting extinguishing agents towards fires, such as water, foam or mist jets. The invention relates more particularly to a foot support carrying the monitor.

PRIOR ART

Monitors for fighting fires are already known. They mainly consist of a pipe system which is mounted on a foot plate, through which water or other fire-fighting agents can flow into the pipe system, and a controllable nozzle which can be directed towards the fire to be fought. The nozzle itself together with its pipe is usually adjustable around a horizontal shaft, whereas the whole monitor is rotatable around a vertical shaft in the foot support. In this way the nozzle can be directed, within certain limits, towards a randomly chosen target.

Monitors are available in different sizes and for different pressures of the through-flowing liquid. One example of such a water pressure is 16 bar. The capacity of a monitor having this pressure may be up to 40.000 liters/minute.

The liquid which is to be ejected through the monitor is usually water, whereby a normal water jet is obtained which, however, by means of a plate in the nozzle, may be formed into droplets or mist. If foam agents are added to the water an ejection of foam is achieved.

Monitors of the aforementioned type are usually used on oil rigs or the like and they have been anchored in strategic positions and can be used quickly.

THE TECHNICAL PROBLEM

Water cannons according to the prior art work satisfactorily per se. Through the high water pressure which must be brought about in these water monitors a high tension however arises in the pipe system, which makes it necessary to arrange a thrust bearing in the rotatable area for taking up these forces. This first bearing may be a standard ball bearing, or ball tracks may be formed directly in the rotatable parts which are facing each other and filled with balls. To make a bearing of this type means an extra cost which is unnecessary as the rotating movements are not large or do not occur often. In an environment, for example on an oil rig, where salt water often splashes over the monitors, the bearings also have to be effectively protected against rusting solid.

THE SOLUTION

It has therefore long been desired to simplify and make bearings for such monitors cheaper and more reliable and one has therefore, according to the invention, arrived at a monitor for ejecting jets of water, foam or mist, comprising a foot support consisting of a lower disco-shaped part having a central through-hole and an upper rotatable part having a central through-hole concentric with the hole in the lower part and a ring attached to the lower part which rotatably connects the upper part to the lower part, and a pipe arrangement carrying the ejecting nozzle attached around the hole in the upper part of the foot support, characterized in that the upper rotatable part comprises an annular flange around the hole which extends outwardly and which is arranged between the lower disc-shaped part and the ring, whereby through-holes are arranged from the central hole in the upper part to the side of the flange which faces the ring so that, in operation, during ejection of the liquid when this is subjected to pressure in the central hole, it will flow from the central hole into the space between the flange and the ring and thereby form a hydrostatic bearing.

According to the invention it is suitable if sealing rings are arranged for sealing the hydrostatic bearing from the surroundings.

It is also suitable, according to the invention, that a seal is arranged around the lower part of the upper part for preventing water from flowing in between the lower part and the rotatable flange.

The ring which connects the upper part is, according to the invention, suitably screwed to the lower part.

Screws are arranged, according to the invention, on the lower side of the lower part for screwing to a base.

DESCRIPTION OF THE FIGURES

The invention will in the following be described more in detail with reference to the attached drawings in which.

DETAILED DESCRIPTION

Figure 1:
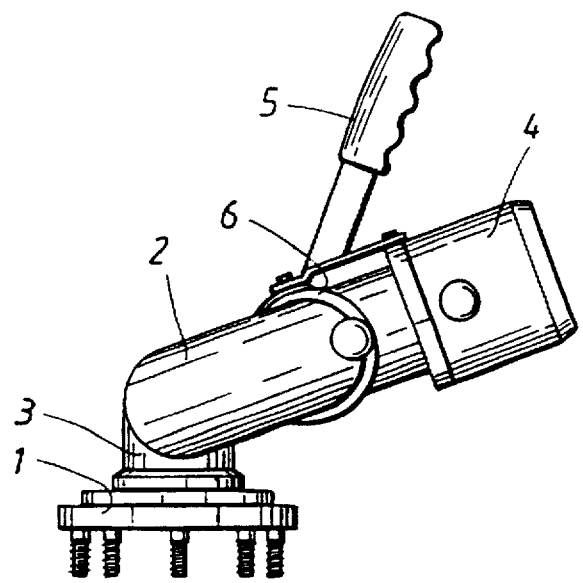
FIG. 1 shows a monitor seen from the side.

FIG. 1 shows a monitor with a foot support 1 on which pipe system 2 is arranged, said pipe system forming the monitor itself. The pipe system 2 has a protruding pipe 3, which is passed over a flange in the foot support 1. The attachment of the pipe part 3 to the foot support 1 occurs suitably by means of screws. The pipe system 2 ends in a nozzle 4 which can be directed up or down by means of a handle 5. It is pivotable around two rings 6.

Figure 2:
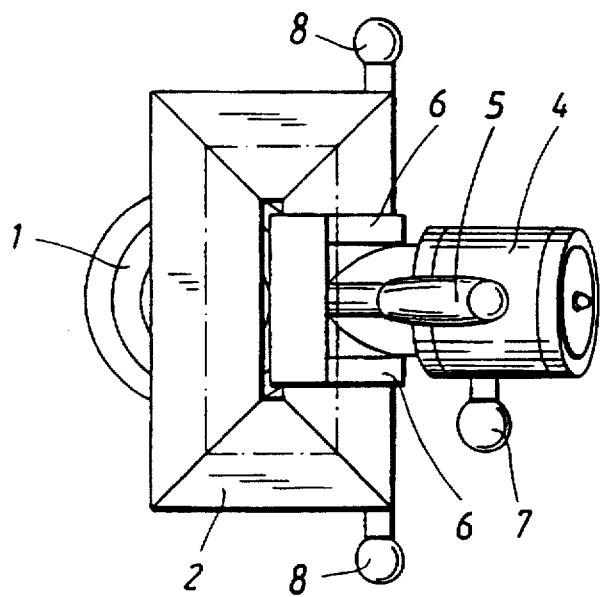
FIG. 2 shows the same monitor seen from above and where

FIG. 2 shows the same monitor as that according to FIG. 1 above and the same reference numerals are valid also for this figure. The handle 7 which has the object of pulling the nozzle 4 back and forth is seen as a protruding ball attached to the nozzle 4. The same type of handles 8 are attached to either side of the pipe system and they have the object to swing the monitor around a vertical shaft. Instead of these handles 8 an electric motor which drives a cog wheel or the like may be arranged in a suitable location. If so it will be applicable for larger dimensions.

Figure 3:
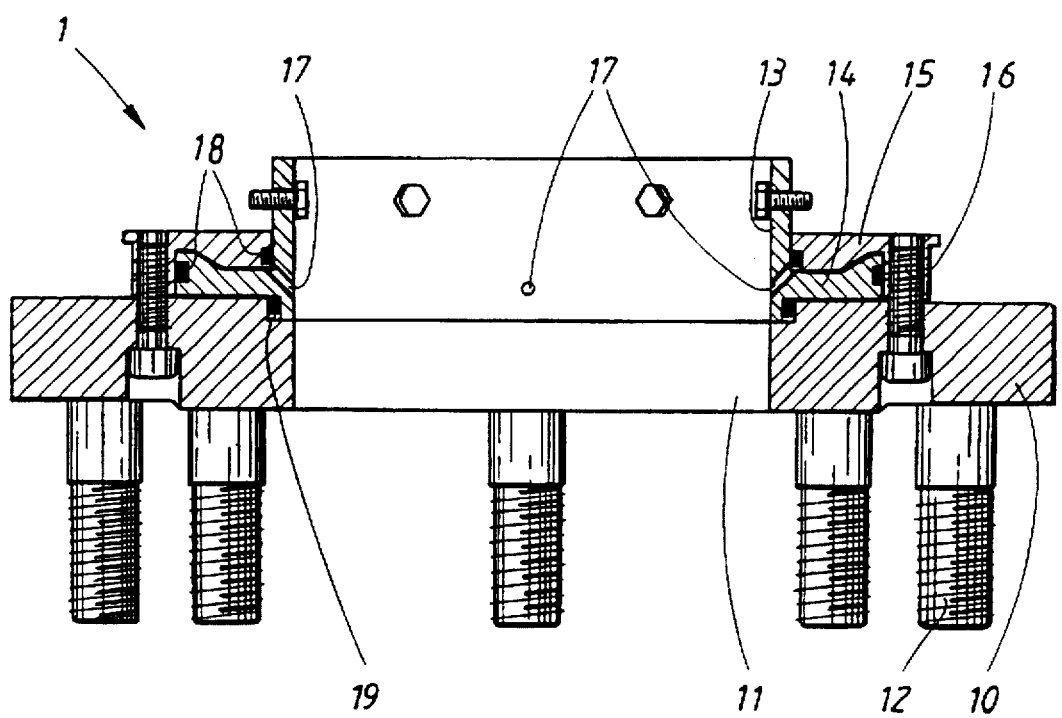
FIG. 3 shows a section of the foot support of a monitor according to the present invention.

FIG. 3 which is a vertical section through the foot support 1, shows a lower disc-shaped part 10 having a central through-hole 11. This disc-shaped lower part 10 is provided with a suitable number of screws 12 for screwing to a support.

The figure further shows an upper part 13 which is also provided with a central through-hole concentric with the through-hole 11 in the lower part 10. This upper part 13 comprises an annular flange 14 directed outwardly and being locked between a fastening ring 15 and the lower part 10, by means of a number of screws 16. The flange 14 should, however, not be locked in such a way that it cannot be moved. Around the pipe-shaped part of the upright upper part 13, the pipe system in the monitor should namely be fastened and the flange 14 must therefore be movable so that the monitor can be rotated. To fasten the pipe system screws which are screwed from the inside may be used suitably.

In the hole in the upper part 13 preferably four throughholes 17 have been made which end in the border surface between the flange 14 and fastening ring 15. When liquid of high pressure is present in the concentric holes, water will therefore be forced out via the through-holes 17 into the gap between the flange 14 and the fastening ring 15. To prevent the water from flowing out and to maintain the water pressure, seals 18 have therefore been provided. A pressure approximately corresponding to the pressure in the central hole will therefore be built up between the flange 14 and the ring 15. This pressure will counteract the tensioning force upwardly which is present in the upper part 13 due to the pressure and the fluid pressure between these surfaces will therefore function as a hydrostatic bearing, which makes the flange easily movable compared to the ring 15. The other side of the flange 14 which abutts the lower disc shaped part 10 will, due to the tensioning force, be lifted up from the disc 10 and no substantial friction will therefore occur when the water pressure is applied. To prevent a water pressure being built up at this side and to prevent water leakage, this side of the flange has also been provided with a seal 19, suitably in the shape of an O-ring.

Through the present invention a bearing for a monitor has been brought about which, as soon as the water pressure is supplied, will function in a smooth and frictionless manner. Due to the simplicity of the bearing great savings are brought about in the manufacturing.

The invention is not limited to the embodiment shown but can be varied in different ways within the scope of the claims.

I claim:

1. A monitor for ejecting fluids comprising:

a lower part having an upper surface, said lower part having a central through-hole for the passage of fluids;

a upper rotatable part having a central through-hole concentric with said through-hole of said lower part, said upper rotatable part including an annular flange;

an ejection nozzle assembly operatively connected to said upper rotatable part about said through-hole of said upper rotatable part;

a ring for rotatably connecting said upper rotatable part to said lower part, said ring being attached to said upper surface of said lower part and arranged so that said annular flange of said upper rotatable part is disposed between said ring and said lower part and an annular space is formed between said ring and said annular flange; and at least one flow opening providing fluid communication between said central through-hole in said upper rotatable part and said annular space, whereby in operation during ejection of fluids, said fluid will flow from said central through-hole into said annular space to form a hydrostatic bearing.

2. The monitor as claimed in claim 1 wherein a seal is provided between said upper rotatable part and said annular flange to prevent water from flowing out of said annular space.

3. The monitor as claimed in claim 2 wherein said seal comprises a plurality of sealing rings for said annular space between said upper rotatable part and said annular flange to prevent water from flowing out of the hydrostatic bearing, said sealing rings including spaced first and second sealing rings arranged to seal the radially inner and outer portions of said annular space.

4. The monitor as claimed in claim 2 wherein a seal is provided between said lower part and said annular flange to prevent water leakage.

5. The monitor as claimed in claim 1 wherein said ring is attached to said lower part by screws.

6. The monitor as claimed in claim 1 further including a support for mounting of said monitor, and wherein said lower part is attached to said support by screws.

* * * * *